United States Patent [19]

Chen

[11] Patent Number: 5,292,804
[45] Date of Patent: Mar. 8, 1994

[54] SEPARATION OF AZEOTROPES IN POLY(VINYL ALCOHOL) PROCESS

[75] Inventor: Michael S. Chen, Zionsville, Pa.

[73] Assignee: Air Products and Chemicals, Inc., Allentown, Pa.

[21] Appl. No.: 764,412

[22] Filed: Sep. 23, 1991

[51] Int. Cl.⁵ .......................................... C08F 116/06
[52] U.S. Cl. .................................... 525/62; 526/319; 526/67
[58] Field of Search ................... 525/62; 526/319, 67; 528/496

[56] References Cited

U.S. PATENT DOCUMENTS

| | | | |
|---|---|---|---|
| 3,560,461 | 2/1971 | Yonezu et al. | 525/62 |
| 4,549,938 | 10/1985 | Berg et al. | 203/51 |
| 5,026,482 | 6/1991 | Sircar | 210/674 |

FOREIGN PATENT DOCUMENTS 53-40868  4/1978  Japan.
53-45677  4/1978  Japan.

Primary Examiner—Joseph L. Schofer
Assistant Examiner—Tom Weber
Attorney, Agent, or Firm—Robert J. Wolff; James C. Simmons; William F. Marsh

[57] ABSTRACT

In a process for preparing poly(vinyl alcohol), an improved method for separating the methanol/acetate azeotropes that result from said process. The azeotropes are separated by selective adsorption of methanol on an adsorbent followed by regeneration of the adsorbent with hot methanol vapor.

14 Claims, 1 Drawing Sheet

SEPARATION OF AZEOTROPES IN POLY(VINYL ALCOHOL) PROCESS

FIELD OF THE INVENTION

The present invention relates to an improved method for separating the methanol/acetate azeotropes that result from the state of the art process for preparing poly(vinyl alcohol).

BACKGROUND OF THE INVENTION

In the state of the art process for preparing poly(vinyl alcohol), two azeotropic mixtures are formed downstream of the poly(vinyl acetate) reactor which are very difficult to separate using conventional techniques. These two azeotropic mixtures are (1) methanol/vinyl acetate and (2) methanol/methyl acetate.

The prevailing method to break these two azeotropic mixtures is a water extractive distillation method wherein water is used to wash the methanol out of the mixture to yield a relatively pure acetate organic phase at the overhead and a methanol/water phase at the bottom in an extractive distillation column. The methanol/water non-azeotropic mixture is then separated by simple distillation with the water being recycled to the extractive distillation column. For example SU 1313-849-A suggests a methanol to water ratio of 1:3-3.2 for a feed of vinyl acetate, methanol and some acetaldehyde and methyl acetate. The overhead is further phase separated and purified to reduce volatiles and water carryover.

DD 241-253-A, on the other hand, suggests an azeotropic distillation of methyl acetate and methanol and/or water by using a boiling hydrocarbon fraction in addition to adding water to yield high recovery of methyl acetate.

U.S. Pat. No. 4,549,938 suggests an extractive distillation method for methanol/methyl acetate mixtures by adding higher boiling oxygenates such as ethylene glycol ether, ethylene carbonate, nitromethane, etc.

Both JP 54-135673 and JP 53-45677 suggest the use of membranes to separate the methanol/methyl acetate azeotropic mixture.

U.S. Pat. No. 5,026,482 suggests a concentration swing adsorption process for methyl acetate/methanol separation in which ethanol is used to regenerate the adsorbent. The subsequent ethanol/acetate and ethanol/methanol mixtures are then separated by simple distillation.

SUMMARY OF THE INVENTION

In a process for preparing poly(vinyl alcohol) which includes stripping poly(vinyl acetate) paste with a first stream of hot methanol vapor, the present invention is an improved method to separate a methanol/vinyl acetate azeotrope or a methanol/methyl acetate azeotrope or both comprising selective absorption of methanol on an absorbent followed by regeneration of the absorbent with a second stream of hot methanol vapor wherein the second stream of hot methanol vapor is recycled as a portion of the first stream of hot methanol vapor.

A key to this invention is the sypnergy created by using hot methanol vapor to regenerate the absorbent in the azeotrope separation process and then recycling this hot methanol vapor to strip the poly(vinyl acetate) paste in the poly(vinyl alcohol) process.

DETAILED DESCRIPTION

Figure 1:
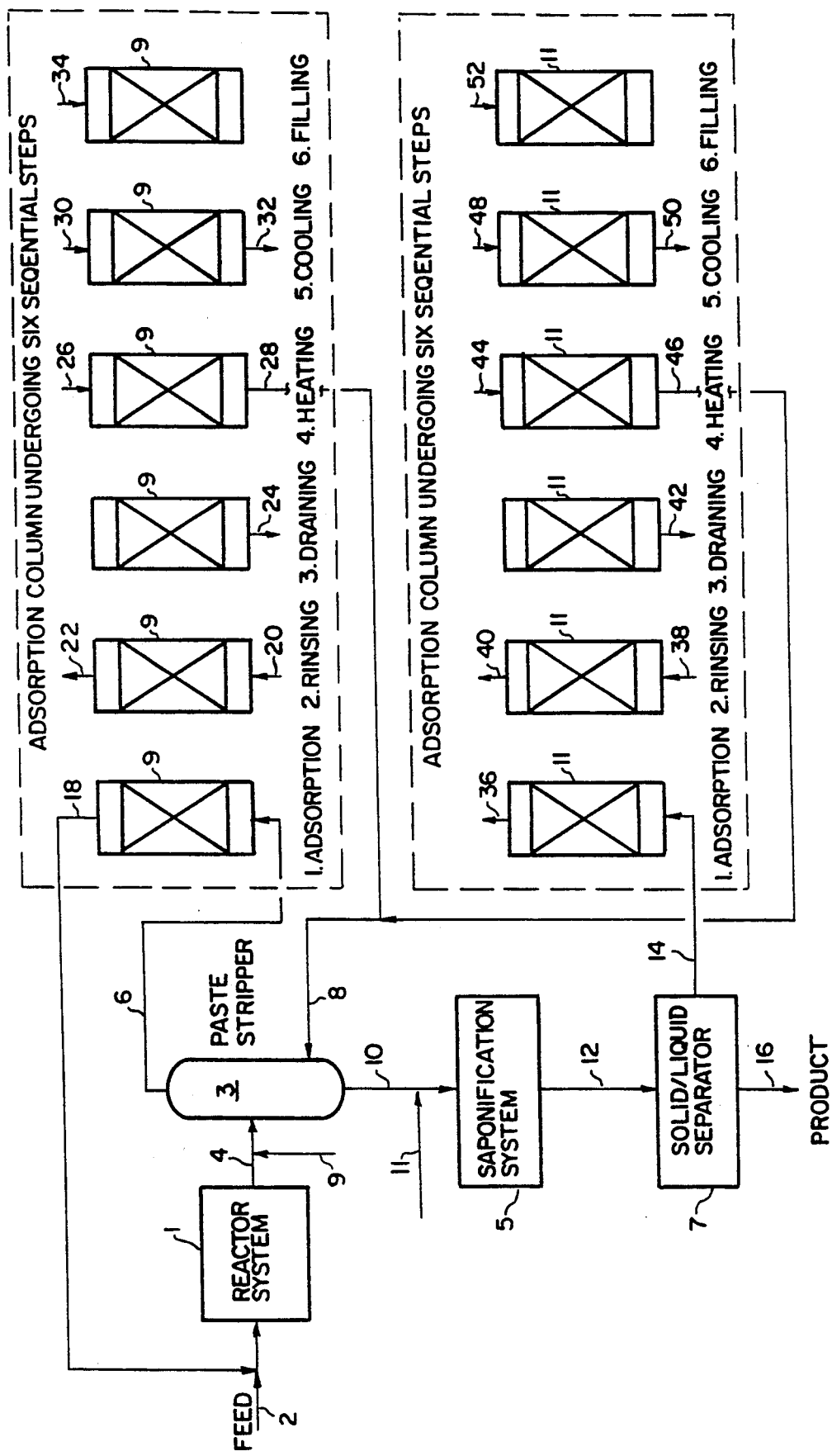
FIG. 1 is a flow diagram of one embodiment of the process of the present invention.

The present invention is an improved method for separating the methanol/acetate azeotropes that are formed as byproducts in the state of the art process for preparing poly(vinyl alcohol). More specifically, the present invention is an improved method for separating the azeotropic mixtures of (1) methanol and vinyl acetate (methanol/vinyl acetate) and (2) methanol and methyl acetate (methanol/methyl acetate) that result, respectively, in steps (b) and (d) of the following basic four step process for preparing poly(vinyl alcohol):

(a) Polymerization Step: A liquid feed stream comprising vinyl acetate, free radical catalyst and methanol are fed to a reactor system (typically a two-stage polykettle reactor) wherein a portion of the vinyl acetate is polymerized into poly(vinyl acetate). The methanol acts as a solvent. The paste-like reactor effluent comprises poly(vinyl acetate), unreacted vinyl acetate and the methanol solvent and is typically referred to as the poly(vinyl acetate) paste.

(b) Stripping Step: The poly(vinyl acetate paste) from step (a) is diluted with additional methanol and fed to the top of a stripping column, typically referred to as the paste stripper. A stream of hot methanol vapor is fed to the bottom of the paste stripper to strip the unreacted vinyl acetate from the poly(vinyl acetate) paste. The overhead from the paste stripper comprises the methanol/vinyl acetate azeotrope at issue while the paste stripper bottoms comprises a paste-like methanol/poly(vinyl acetate) mixture;

(c) Saponification Step: The paste stripper bottoms from step (b) is mixed with caustic and fed to a saponification system wherein the poly(vinyl acetate) reacts with the methanol to produce the poly(vinyl alcohol) product (a solid) and methyl acetate. Since an excess of methanol is used in the saponification reaction, the effluent from the saponification system comprises a methanol/methyl acetate/poly(vinyl alcohol) mixture.

(d) Separation Step: The saponification system effluent from step (c) is fed to a solid/liquid separator (typically a centrifuge) to separate the saponifier effluent into a solid effluent comprising the poly(vinyl alcohol) product and a liquid effluent comprising the methanol/methyl acetate azeotrope at issue.

The improved method for separating the methanol/acetate azeotropes that result in steps (b) and (d) above comprises selective adsorption of methanol on an adsorbent followed by regeneration of the adsorbent with hot methanol vapor wherein the hot methanol vapor is recycled to strip the poly(vinyl acetate) paste in step (b) of the above poly(vinyl alcohol) process. One embodiment of the improved method comprises the following six step cycle:

(1) Adsorption Step: The azeotropic mixture of methanol and either vinyl acetate or methyl acetate is fed as a feedstock to an adsorption column containing a methanol selective adsorbent (such as 13X zeolite) which selectively adsorbs the methanol while allowing the acetate component to pass through the column. Eventually, the capacity of the adsorbent to adsorb the methanol will be reached at which time methanol will begin to break through the column as part of the column effluent. Upon, or just short of such breakthrough occurring, the flow of the azeotrope into the column is discontinued. The effluent during this step can be stored for later use in filling the column in step (6). With respect to the methanol/vinyl acetate azeotrope, the effluent can also be used as a portion of the vinyl acetate feed to the reactor in step (a) of the poly(vinyl alcohol) process.

(2) Rinse Step: The purpose of the rinse step is to displace that portion of the acetate component which is co-adsorbed with the methanol in step (1). At the end of step (1), the column is rinsed with liquid methanol in a direction co-current to the azeotrope feedstock flow. The effluent during this step has an azeotrope feedstock-like composition and can be recycled as additional azeotrope feedstock. The rinse step is continued until the column is saturated with liquid methanol.

(3) Drain Step: At the end step (2), the column is drained to remove a portion of the methanol from step (2). The effluent during this step can be used as a portion of the liquid methanol rinse in step (2) of a subsequent cycle.

(4) Heating Step: The purpose of the heating step is to regenerate the column by vaporizing and purging the liquid methanol remaining in the column at the end of step (3). At the end of step (3), the column is regenerated by flowing hot methanol vapor through the column in a direction counter-current to the azeotrope feedstock flow. A key to this invention is that the effluent during this step (comprising the hot methanol vapor) is also used to strip the reactor effluent in step (b) above. By using hot methanol vapor to regenerate the adsorption column, an overall synergy is achieved between the azeotropic separation process and the poly(vinyl alcohol) process since hot methanol vapor is also required in step (b) of the poly(vinyl alcohol) process. In other words, the present invention performs the azeotropic separations while also reducing the hot methanol vapor requirement in the poly(vinyl alcohol) process.

(5) Cooling Step: The purpose of the cooling step is to further regenerate the column by condensing and purging the hot methanol vapor remaining in the column at the end of step (4). At the end of step (4), the column is further regenerated by flowing the acetate component in the liquid state through the column in a direction counter-current to the azeotrope feedstock flow. The effluent during this step will have an azeotrope feedstock-like composition and can be recycled as additional azeotrope feedstock.

(6) Filling Step: The purpose of this final step is to complete the regeneration of the column thereby making the column ready to start a new cycle beginning with step (1). At the end of step (5), the column is filled with the acetate component in the liquid state.

The operating pressure inside the adsorption column during the above six step azeotrope separation cycle is typically in the range of 0-150 psig. The operating temperature inside the adsorption column during the cycle varies between the temperature of the liquid azeotrope feedstock in step (1) (typically ambient temperature) and the temperature of the hot methanol vapor in step (4) (typically 200°-400° F. higher than the boiling point of methanol at the operating pressure in issue). Typical product purities which can be achieved by the cycle are 95% to 99.5% plus for both the methanol and the acetate component. Typical recoveries are also in the 95% to 99.5% plus range for both components of the azeotrope.

In addittion to the synery created by using hot methanol vapor to regenerate the adsorbent in the azeotrope separation process and then recycling this hot methanol vapor to strip the poly(vinyl acetate) paste in the poly(vinyl alcohol) process as discussed in (4) above, the present invention offers the following further advantages over existing methods to separate the azeotropes in issue:

(1) Unlike methods which introduce water into the process (such as the prevailing water extractive distillation method wherein water is used to wash the methanol out of the azeotrope), there is no need to separate subsequent water/methanol mixtures by distillation.

(2) Unlike an extractive distillation method in which a higher boiling oxygenate is added to the azeotrope, there is no need to separate subsequent oxygenate/acetate mixtures by distillation.

(3) Unlike the use of membranes to separate the methanol from the azeotrope, the present invention is able to achieve product purities in the range of 95% to 99.5% plus for both the methanol and the acetate component. This high degree of separation is not possible with membranes.

(4) Unlike concentration swing adsorption methods in which ethanol is used to regenerate the adsorbent, there is no need to separate subsequent ethanol/acetate and ethanol/methanol mixtures by distillation.

One embodiment of the process of the present invention will now be described in greater detail as it relates to the separation of both azeotropes in issue within the state of the art process for preparing poly(vinyl alcohol). Referring to FIG. 1, a feed stream 2 comprising vinyl acetate is introduced into a reactor system 1 to produce a reactor effluent 4 comprising poly(vinyl acetate) and unreacted vinyl acetate. The reactor effluent 4 is diluted with additional methanol (stream 9) and fed to a paste stripper 3 wherein hot methanol vapor in stream 8 is used to strip the reactor effluent 4 into a paste stripper overhead 6 comprising the methanol/vinyl acetate azeotrope at issue and a paste stripper bottoms 10 comprising a methanol/poly(vinyl acetate) mixture. The paste stripper bottoms 10 is mixed with caustic (stream 11) and fed to a saponification system 5 wherein the poly(vinyl acetate) reacts with the methanol to produce a saponification effluent 12 comprising a methanol/methyl acetate/poly(vinyl alcohol) mixture. The saponification effluent 12 is fed to a solid/liquid separator 7 to separate the saponification effluent 12 into a solid effluent 16 comprising the poly(vinyl alcohol) product and a liquid effluent 14 comprising the methanol/methyl acetate azeotrope at issue.

The paste stripper overhead 6 comprising the methanol/vinyl acetate azeotrope at issue is fed as a feedstock to an adsorption column 9 containing a methanol selective adsorbent. A vinyl acetate enriched effluent 18 is discharged from column 9 and is recycled as a portion of the feed stream 2 to the reactor system 1. The azeotrope feedstock flow 6 is continued until methanol breakthrough occurs in column 9 at which time column 9 is rinsed in a direction co-current to the azeotrope feedstock flow 6 with a rinse liquid 20 comprising liquid methanol. A rinse effluent 22 having an azeotrope feedstock-like composition is discharged. The rinsing is continued until column 9 is saturated with the rinse liquid 20 at which time column 9 is drained to withdraw a drain effluent 24 comprising a portion of the rinse liquid 20 remaining in column 9. After draining column 9, column 9 is heated to vaporize and purge the remaining rinse liquid 20 in column 9 by flowing a heating stream 26 comprising hot methanol vapor through column 9 in a direction counter-current to the azeotrope feedstock flow 6. A heating effluent 28 comprising hot methanol vapor is discharged and recycled to the paste stripper 3 as a portion of the hot methanol vapor which is used to strip the reactor effluent 4. After the heating step, column 9 is cooled to condense and purge the heating stream 26 remaining in column 9 at the end of the heating step by flowing a cooling stream 30 comprising liquid vinyl acetate through column 9 in a direction counter-current to the azeotrope feedstock flow 6. A cooling effluent 23 having an azeotrope feedstock-like composition is discharged. Finally, column 9 is filled with a liquid vinyl acetate fill stream 34 thereby making column 9 ready to start a new adsorption cycle.

The liquid effluent 14 from the solid/liquid separator 7 comprising the methanol/methyl acetate azeotrope at issue is fed as a feedstock to an adsorption column 11 containing a methanol selective adsorbent. A methyl acetate enriched effluent 36 is discharged from column 11. The azeotrope feedstock flow 14 is continued until methanol breakthrough occurs in column 11 at which time column 11 is rinsed in a direction co-current to the azeotrope feedstock flow 14 with a rinse liquid 38 comprising liquid methanol. A rinse effluent 40 having an azeotrope feedstock-like composition is discharged. The rinsing is continued until column 11 is saturated with the rinse liquid 38 at which time column 11 is drained to withdraw a drain effluent 42 comprising a portion of the rinse liquid 38 remaining in column 11. After draining column 11, column 11 is heated to vaporize and purge the remaining rinse liquid 38 in column 11 by flowing a heating stream 44 comprising hot methanol vapor through column 11 in a direction counter-current to the azeotrope feedstock flow 14. A heating effluent 46 comprising hot methanol vapor is discharged and recycled to the paste stripper 3 as a portion of the hot methanol vapor which is used to strip the reactor effluent 4. After the heating step, column 11 is cooled to condense and purge the heating stream 44 remaining in column 11 at the end of the heating step by flowing a cooling stream 48 comprising liquid vinyl acetate through column 11 in a direction counter-current to the azeotrope feedstock flow 14. A cooling effluent 50 having an azeotrope feedstock-like composition is discharged. Finally, column 11 is filled with a liquid methyl acetate fill stream 52 thereby making column 11 ready to start a new adsorption cycle.

Having thus described the present invention, what is now deemed appropriate for Letters Patent is set forth in the following claims.

I claim:

1. In a process for preparing poly(vinyl alcohol) which includes stripping poly(vinyl acetate) paste with a first stream of hot methanol vapor, an improved method to separate a methanol/vinyl acetate azeotrope or a methanol/methyl acetate azeotrope or both comprising selective adsorption of methanol on an adsorbent followed by regeneration of the adsorbent with a second stream of hot methanol vapor wherein the second stream of hot methanol vapor is recycled as a portion of the first stream of hot methanol vapor.

2. The process of claim 1 wherein the process for preparing poly(vinyl alcohol) comprises:
(a) introducing a feed stream comprising vinyl acetate into a reactor system to produce a reactor effluent comprising poly(vinyl acetate) and unreacted vinyl acetate;
(b) feeding the reactor effluent to a paste stripper wherein hot methanol vapor is used to strip the reactor effluent into a paste stripper overhead comprising the methanol/vinyl acetate azeotrope and a paste stripper bottoms comprising a methanol/poly(vinyl acetate) mixture;
(c) feeding the paste stripper bottoms to a saponification system to produce a saponification effluent comprising a methanol/methyl acetate/poly(vinyl alcohol) mixture;
(d) feeding the saponification effluent to a solid/liquid separator to separate the saponification effluent into a solid effluent comprising the poly(vinyl alcohol) and a liquid effluent comprising the methanol/methyl acetate azeotrope.

3. The process of claim 2 wherein the improved method to separate the methanol/vinyl acetate azeotrope comprises:
(i) flowing a first feedstock comprising the methanol/vinyl acetate azeotrope through a first adsorption column containing a methanol selective adsorbent while discharging a vinyl acetate enriched effluent which effluent is recycled to the reactor system in step (a), said flowing of the first feedstock continuing until methanol breakthrough occurs in the first adsorption column;
(ii) rinsing the first adsorption column in a direction co-current to the first feedstock flow with a first rinse liquid comprising liquid methanol while discharging a first rinse effluent having a first feedstock-like composition, said rinsing continuing until the first adsorption column is saturated with the first rinse liquid;
(iii) draining the first adsorption column to withdraw a first drain effluent comprising a portion of the first rinse liquid remaining in the first adsorption column at the end of step (ii);
(iv) heating the first adsorption column to vaporize and purge the first rinse liquid remaining in the first adsorption column at the end of step (iii) by flowing a first heating stream comprising hot methanol vapor through the first adsorption column in a direction counter-current to the first feedstock flow while discharging a first heating effluent comprising hot methanol vapor wherein the first heating effluent is used to strip the reactor effluent in step (b);
(v) cooling the first adsorption column to condense and purge the first heating stream remaining in the first adsorption column at the end of step (iv) by flowing a first cooling stream comprising liquid vinyl acetate through the first adsorption column in a direction counter-current to the first feedstock flow while discharging a first cooling effluent having a first feedstock-like composition; and finally
(vi) filling the first adsorption column with a first fill stream comprising liquid vinyl acetate thereby making the first adsorption column ready to start a subsequent cycle of steps wherein the subsequent cycle of steps comprises steps (i) through (vi).

4. The process of claim 3 wherein the improved method to separate the methanol/methyl acetate azeotrope comprises:
(I) flowing a second feedstock comprising the methanol/methyl acetate azeotrope through a second adsorption column containing a methanol selective adsorbent while discharging a methyl acetate enriched effluent, said flowing of the second feedstock continuing until methanol breakthrough occurs in the second adsorption column;

(II) rinsing the second adsorption column in a direction co-current to the second feedstock flow with a second rinse liquid comprising liquid methanol while discharging a second rinse effluent having a second feedstock-like composition, said rinsing continuing until the second adsorption column is saturated with the second rinse liquid;

(III) draining the second adsorption column to withdraw a second drain effluent comprising a portion of the second rinse liquid remaining in the second adsorption column at the end of step (II);

(IV) heating the second adsorption column to vaporize and purge the second rinse liquid remaining in the second adsorption column at the end of step (III) by flowing a second heating stream comprising hot methanol vapor through the second adsorption column in a direction counter-current to the second feedstock flow while discharging a second heating effluent comprising hot methanol vapor wherein the second heating effluent is used to strip the reactor effluent in step (b);

(V) cooling the second adsorption column to condense and purge the second heating stream remaining in the second adsorption column at the end of step (IV) by flowing a second cooling stream comprising liquid methyl acetate through the second adsorption column in a direction counter-current to the second feedstock flow while discharging a second cooling effluent having a second feedstock-like composition; and finally (VI) filling the second adsorption column with a second fill stream comprising liquid methyl acetate thereby making the second adsorption column ready to start a succeeding cycle of steps wherein the succeeding cycle of steps comprises steps (I) through (VI).

5. The process of claim 2 wherein the reactor system in step (a) comprises a two-stage polykettle reactor.

6. The process of claim 2 wherein the solid/liquid separator in step (c) comprises a centrifuge.

7. The process of claim 3 wherein step (i) further comprises recycling a portion of the vinyl acetate effluent for use as the first fill stream in step (vi).

8. The process of claim 3 wherein step (ii) further comprises recycling the first rinse effluent having a first feedstock-like composition as a portion of the first feedstock in step (i) of the subsequent cycle.

9. The process of claim 3 wherein step (iii) further comprises recycling the first drain effluent for use as a portion of the first rinse liquid in step (ii) of the subsequent cycle.

10. The process of claim 3 wherein step (v) further comprises recycling the first cooling effluent having a first feedstock-like composition as a portion of the first feedstock in step (i) of the subsequent cycle.

11. The process of claim 4 wherein step (I) further comprises recycling a portion of the methyl acetate effluent for use as the second fill stream in step (vi).

12. The process of claim 4 wherein step (II) further comprises recycling the second rinse effluent having a second feedstock-like composition as a portion of the second feedstock in step (I) of the succeeding cycle.

13. The process of claim 4 wherein step (III) further comprises recycling the second drain effluent for use as a portion of the second rinse liquid in step (II) of the succeeding cycle.

14. The process of claim 4 wherein step (V) further comprises recycling the second cooling effluent having a second feedstock-like composition as a portion of the second feedstock in step (I) of the succeeding cycle.

* * * * *